US012368316B2

(12) United States Patent
Zhang

(10) Patent No.: US 12,368,316 B2
(45) Date of Patent: Jul. 22, 2025

(54) POWER SUPPLY DEVICE

(71) Applicant: TOSHIBA MITSUBISHI-ELECTRIC INDUSTRIAL SYSTEMS CORPORATION, Tokyo (JP)

(72) Inventor: Xiaochen Zhang, Chuo-ku (JP)

(73) Assignee: TMEIC CORPORATION, Tokyo (JP)

( * ) Notice: Subject to any disclaimer, the term of this patent is extended or adjusted under 35 U.S.C. 154(b) by 0 days.

(21) Appl. No.: 18/689,338

(22) PCT Filed: Jan. 7, 2022

(86) PCT No.: PCT/JP2022/000377
§ 371 (c)(1),
(2) Date: Mar. 5, 2024

(87) PCT Pub. No.: WO2023/132060
PCT Pub. Date: Jul. 13, 2023

(65) Prior Publication Data
US 2025/0132597 A1    Apr. 24, 2025

(51) Int. Cl.
H02J 9/06    (2006.01)
H02J 7/34    (2006.01)
H02M 1/00    (2007.01)
H02M 3/335    (2006.01)
H02M 7/48    (2007.01)

(52) U.S. Cl.
CPC ............... H02J 9/062 (2013.01); H02J 7/34 (2013.01); H02M 1/0032 (2021.05); H02M 3/33584 (2013.01); H02M 7/48 (2013.01)

(58) Field of Classification Search
CPC .......... H02J 9/062; H02J 7/34; H02M 1/0032; H02M 3/33584; H02M 7/48
See application file for complete search history.

(56) References Cited

U.S. PATENT DOCUMENTS 7,638,899 B2 * 12/2009 Tracy .................... H02M 7/493
307/64
2012/0086269 A1    4/2012 Nakano et al.

FOREIGN PATENT DOCUMENTS

WO    WO 2011/033820 A1    3/2011

OTHER PUBLICATIONS

International Search Report issued Mar. 1, 2022 in PCT/JP2022/000377, filed on Jan. 7, 2022, 2 pages.

* cited by examiner

Primary Examiner — Carlos Amaya
(74) Attorney, Agent, or Firm — Oblon, McClelland, Maier & Neustadt, L.L.P.

(57) ABSTRACT

At least one first power converter of a plurality of power converters has a charging mode and a standby mode, the charging mode being a mode of converting AC power supplied from an AC power supply through a switch into DC power and storing the DC power in a corresponding power storage device, the standby mode being a mode of generating a control signal for power conversion and awaiting the power conversion. When an AC voltage supplied from the AC power supply is normal, a controller turns on the switch and alternately switches the at least one first power converter between the charging mode and the standby mode. When the AC voltage is not normal, the controller turns off the switch and controls the plurality of power converters such that each of the plurality of power converters converts DC power of the power storage device into AC power and supplies the AC power to a load.

6 Claims, 12 Drawing Sheets

POWER SUPPLY DEVICE

TECHNICAL FIELD

The present disclosure relates to a power supply device.

BACKGROUND ART

WO 2011/033820 (PTL 1) discloses a power supply device including a switch connected between an alternating current (AC) power supply and a load, and a plurality of power converters connected between the load and a plurality of power storage devices, respectively.

In PTL 1, of the plurality of power converters, the number of power converters required to drive the load are only operated, and the remaining power converters are disconnected from the load to stop the operation. As a result, a switching loss that occurs in the plurality of power converters can be reduced and the efficiency of the power supply device can be enhanced, as compared with the case of operating all of the power converters regardless of a load capacity.

CITATION LIST

Patent Literature

PTL 1: WO 2011/033820

SUMMARY OF INVENTION

Technical Problem

However, in the power supply device described in PTL 1, a reduction in responsiveness caused by a rapid increase in load capacity is concerned, because the number of power converters required to drive the load are only operated, and the remaining power converters are disconnected from the load to stop the operation. In addition, since the number of power converters to be operated increases as the load capacity increases, the effect of reducing a switching loss cannot be sufficiently obtained in the situation of a large load capacity.

The present disclosure has been made to solve the above-described problems, and an object of the present disclosure is to provide a power supply device having high-speed responsiveness and high efficiency.

Solution to Problem

A power supply device according to an aspect of the present disclosure includes: an input terminal; an output terminal; a DC terminal; a switch; a plurality of power converters; and a controller. The input terminal is connected to an AC power supply. The output terminal is connected to a load. The DC terminal is connected to a power storage device. The switch is connected between the input terminal and the output terminal. Each of the plurality of power converters performs bidirectional power conversion between the DC terminal and the output terminal. The controller controls the switch and the plurality of power converters. The plurality of power converters include at least one first power converter. The at least one first power converter has a charging mode and a standby mode, the charging mode being a mode of converting AC power supplied from the AC power supply through the switch into DC power and storing the DC power in a corresponding power storage device, the standby mode being a mode of generating a control signal for the power conversion and awaiting the power conversion. When an AC voltage supplied from the AC power supply is normal, the controller turns on the switch and alternately switches the at least one first power converter between the charging mode and the standby mode. When the AC voltage is not normal, the controller turns off the switch and controls the plurality of power converters such that each of the plurality of power converters converts DC power of the power storage device into AC power and supplies the AC power to the load.

Advantageous Effects of Invention

According to the present disclosure, there can be provided a power supply device having high-speed responsiveness and high efficiency.

DESCRIPTION OF EMBODIMENTS

Figure 1:
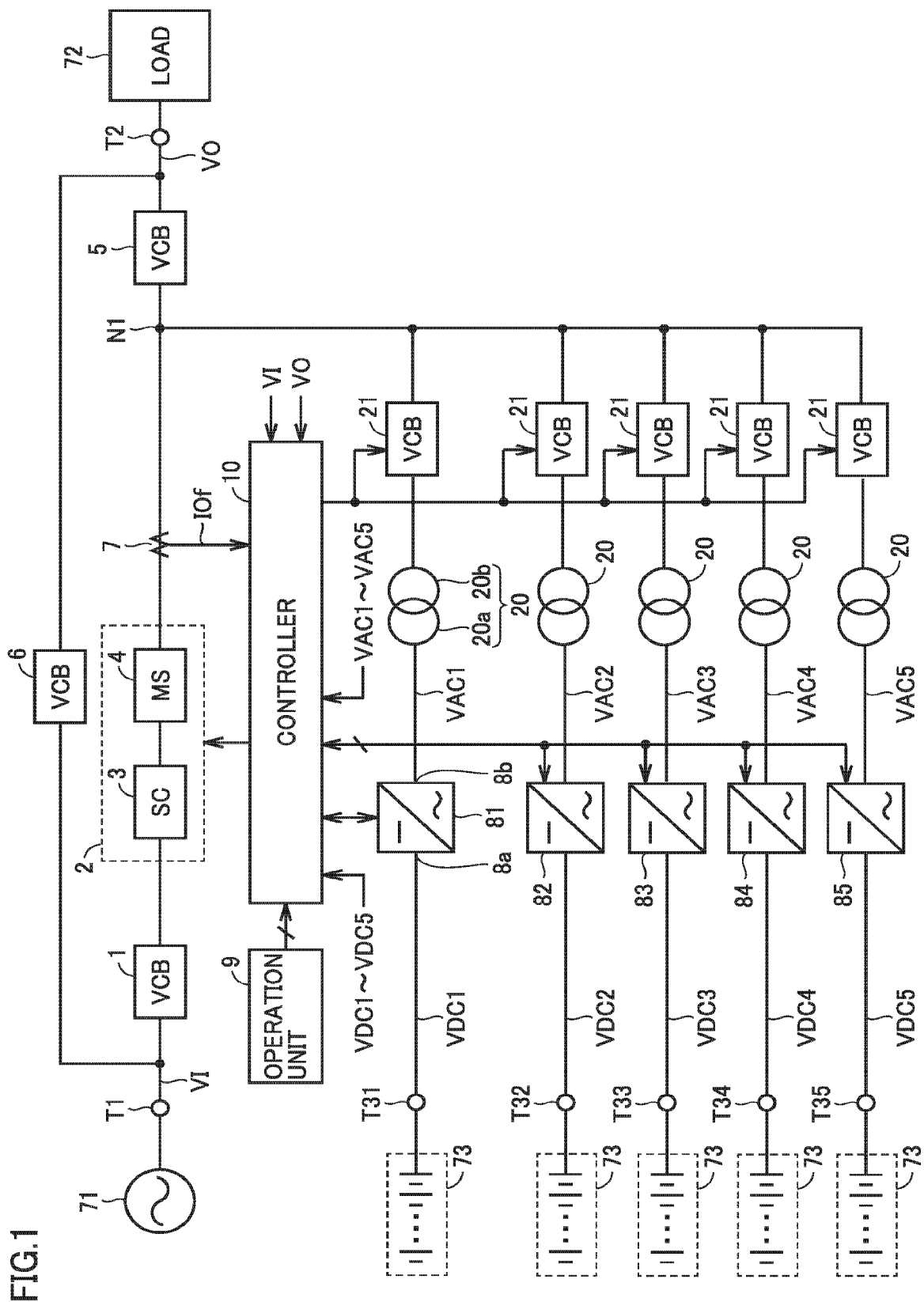
FIG. 1 is a block diagram showing a configuration example of an instantaneous voltage drop compensation device to which a power supply device according to an embodiment of the present disclosure is applied.

An embodiment of the present disclosure will be described in detail hereinafter with reference to the drawings, in which the same or corresponding portions are denoted by the same reference characters and description thereof will not be repeated.

Configuration of Instantaneous Voltage Drop Compensation Device

FIG. 1 is a block diagram showing a configuration example of an instantaneous voltage drop compensation device to which a power supply device according to an embodiment of the present disclosure is applied. As shown in FIG. 1, the instantaneous voltage drop compensation device includes an input terminal T1, an output terminal T2, a plurality of DC terminals T31 to T35, vacuum circuit breakers (VCBs) 1, 5, 6, and 21, a high speed switch (HSS) 2, a current detector 7, a plurality of bidirectional converters 81 to 85, a plurality of transformers 20, an operation unit 9, and a controller 10. Although FIG. 1 shows five bidirectional converters 81 to 85, the number of the plurality of bidirectional converters is not particularly limited.

Input terminal T1 receives an AC voltage VI of a commercial frequency supplied from a commercial AC power supply 71. An instantaneous value of AC voltage VI is detected by controller 10. When AC voltage VI falls below a predetermined lower limit value, controller 10 determines the occurrence of an instantaneous voltage drop.

Output terminal T2 is connected to a load 72. Load 72 is driven by an AC voltage VO supplied from output terminal T2. An instantaneous value of AC voltage VO is detected by controller 10.

The plurality of DC terminals T31 to T35 are connected to a plurality of power storage devices 73, respectively. Each of power storage devices 73 stores electric power. Each of power storage devices 73 may be a battery, or may be a capacitor. Each of DC voltages VDC1 to VDC5 of DC terminals T31 to T35 is detected by controller 10.

VCB 1, HSS 2 and VCB 5 are connected in series between input terminal T1 and output terminal T2. VCBs 1 and 5 are on during normal operation of the instantaneous voltage drop compensation device, and are off, for example, during maintenance of HSS 2 or during bypass power feeding.

HSS 2 includes a semiconductor switch 3 and a mechanical switch 4 that are connected in series. Each of semiconductor switch 3 and mechanical switch 4 is controlled by controller 10. Each of semiconductor switch 3 and mechanical switch 4 is turned on when AC voltage VI is normal (in a normal state), and is turned off when AC voltage VI is not normal (in an instantaneous voltage drop state). HSS 2 corresponds to one example of "switch".

Semiconductor switch 3 has the characteristics of higher operation speed and lower withstand voltage as compared with mechanical switch 4. Mechanical switch 4 has the characteristics of lower operation speed and higher withstand voltage as compared with semiconductor switch 3. Semiconductor switch 3 and mechanical switch 4 are connected in series, to thereby form HSS 2 that has a high withstand voltage and is instantaneously turned off when an instantaneous voltage drop occurs.

Current detector 7 detects an AC current IO flowing through HSS 2, and provides a signal IOf indicating the detected value to controller 10.

VCB 6 is connected between input terminal T1 and output terminal T2. VCB 6 is off during normal operation of the instantaneous voltage drop compensation device, and is on, for example, during bypass power feeding. When VCB 6 is turned on, AC voltage VI is supplied from commercial AC power supply 71 through VCB 6 to load 72, and load 72 is driven.

A DC terminal 8a of bidirectional converter 81 is connected to DC terminal T31, and an AC terminal 8b thereof is connected to a primary winding 20a of transformer 20. A secondary winding 20b of transformer 20 is connected to a node N1 between HSS 2 and VCB 5, with VCB 21 interposed therebetween. An instantaneous value of an AC voltage VAC1 that appears at primary winding 20a of transformer 20 is detected by controller 10.

DC terminal 8a of bidirectional converter 82 is connected to DC terminal T32, and AC terminal 8b thereof is connected to primary winding 20a of transformer 20. Secondary winding 20b of transformer 20 is connected to node N1, with VCB 21 interposed therebetween. An instantaneous value of an AC voltage VAC2 that appears at primary winding 20a of transformer 20 is detected by controller 10.

DC terminal 8a of bidirectional converter 83 is connected to DC terminal T33, and AC terminal 8b thereof is connected to primary winding 20a of transformer 20. Secondary winding 20b of transformer 20 is connected to node N1, with VCB 21 interposed therebetween. An instantaneous value of an AC voltage VAC3 that appears at primary winding 20a of transformer 20 is detected by controller 10.

DC terminal 8a of bidirectional converter 84 is connected to DC terminal T34, and AC terminal 8b thereof is connected to primary winding 20a of transformer 20. Secondary winding 20b of transformer 20 is connected to node N1, with VCB 21 interposed therebetween. An instantaneous value of an AC voltage VAC4 that appears at primary winding 20a of transformer 20 is detected by controller 10.

DC terminal 8a of bidirectional converter 85 is connected to DC terminal T35, and AC terminal 8b thereof is connected to primary winding 20a of transformer 20. Secondary winding 20b of transformer 20 is connected to node N1, with VCB 21 interposed therebetween. An instantaneous value of an AC voltage VAC5 that appears at primary winding 20a of transformer 20 is detected by controller 10.

Each of bidirectional converters 81 to 85 is a well-known bidirectional converter including a plurality of switching elements. Each of the switching elements is formed by connecting a freewheeling diode (FWD) in antiparallel to a self-extinguishing-type semiconductor switching element such as, for example, an insulated gate bipolar transistor (IGBT), a gate commutated turn-off (GCT) thyristor or a metal oxide semiconductor field-effect transistor (MOSFET). Each of bidirectional converters 81 to 85 is subjected to, for example, pulse width modulation (PWM) control by controller 10. By turning on and off each of the switching elements included in each of the bidirectional converters at a predetermined switching frequency, conversion of AC power into DC power and conversion of DC power into AC power are possible.

When AC voltage VI supplied from commercial AC power supply 71 is normal (in a normal state of commercial AC power supply 71), each of bidirectional converters 81 to 85 converts AC power supplied from commercial AC power supply 71 through VCB 1, HSS 2, VCB 21, and transformer 20 into DC power and stores the DC power in power storage device 73.

When AC voltage VI is not normal (in the instantaneous voltage drop state), each of bidirectional converters 81 to 85 converts DC power of power storage device 73 into AC power and outputs the AC power to AC terminal 8b. The AC power is supplied to load 72 through transformer 20 and VCBs 21 and 5.

Each of transformers 20 transmits and receives the AC power between node N1 and a corresponding bidirectional converter. VCB 21 is on during normal operation of the instantaneous voltage drop compensation device, and is off, for example, during maintenance of HSS 2 or a corresponding bidirectional converter.

Operation unit 9 includes a plurality of buttons, a plurality of switches, an image display unit and the like. By operating operation unit 9, a user of the instantaneous voltage drop compensation device can provide an instruction to start up, stop, automatically operate or manually operate the instantaneous voltage drop compensation device, and perform various condition settings or the like. Operation unit 9 provides a signal indicating the user's instruction or the like to controller 10.

Controller 10 controls the instantaneous voltage drop compensation device as a whole, based on the signal provided from operation unit 9, AC voltages VI, VO and VAC1 to VAC5, DC voltages VDC1 to VDC5, signal IOf output from current detector 7, and the like.

When AC voltage VI supplied from commercial AC power supply 71 is normal, controller 10 controls bidirectional converters 81 to 85 such that DC voltages VDC1 to VDC5 of DC terminals T31 to T35 become equal to a predetermined reference DC voltage VDCr, based on AC voltages VAC1 to VAC5, DC voltages VDC1 to VDC5, and signal IOf output from current detector 7.

When AC voltage VI supplied from commercial AC power supply 71 is not normal (in the instantaneous voltage drop state), controller 10 controls bidirectional converters 81 to 85 such that AC voltage VO becomes equal to a predetermined reference AC voltage VOr, based on AC voltage VO of output terminal T2.

Basic Operation of Instantaneous Voltage Drop Compensation Device

Next, a basic operation during normal operation of the instantaneous voltage drop compensation device shown in FIG. 1 will be described.

During normal operation, VCBs 1, 5 and 21 are on and VCB 6 is off. When AC voltage VI supplied from commercial AC power supply 71 is normal, HSS 2 is turned on, the AC power is supplied from commercial AC power supply 71 through VCB 1, HSS 2 and VCB 5 to load 72, and load 72 is operated.

In addition, the AC power is supplied from commercial AC power supply 71 through VCB 1, HSS 2, VCBs 21, and transformers 20 to bidirectional converters 81 to 85, and the AC power is converted into DC power by bidirectional converters 81 to 85 and the DC power is stored in power storage devices 73. At this time, DC voltages VDC1 to VDC5 of DC terminals T31 to T35 are maintained at reference DC voltage VDCr.

For example, when a lightning strike occurs and an instantaneous voltage drop of AC voltage VI occurs, controller 10 determines that AC voltage VI supplied from commercial AC power supply 71 is not normal, and HSS 2 is instantaneously turned off, thereby electrically separating commercial AC power supply 71 from load 72.

At the same time, the DC power of power storage devices 73 is converted into AC power by bidirectional converters 81 to 85, the AC power is supplied to load 72 through transformers 20 and VCBs 21 and 5, and the operation of load 72 is continued. At this time, AC voltage VO of output terminal T2 is maintained at reference AC voltage VOr having a commercial frequency.

When AC voltage VI returns to a normal voltage (when the power of commercial AC power supply 71 is restored), HSS 2 is turned on again, the AC power is supplied from commercial AC power supply 71 through VCB 1, HSS 2 and VCB 5 to load 72, and load 72 is operated. In addition, the AC power supplied from commercial AC power supply 71 is converted into DC power by bidirectional converters 81 to 85 and the DC power is stored in power storage devices 73.

Therefore, according to the instantaneous voltage drop compensation device, even when an instantaneous voltage drop occurs, the operation of load 72 can be continued.

A phenomenon in which AC voltage VI supplied from commercial AC power supply 71 drops for a relatively short time period (e.g., shorter than one second) is called "instantaneous voltage drop". A phenomenon in which AC voltage VI drops for a relatively long time period (e.g., equal to or longer than one second) is called "power failure". A device that supplies AC power to load 72 during an instantaneous voltage drop is called "instantaneous voltage drop compensation device", and a device that supplies AC power to load 72 during a power failure is called "uninterruptible power supply device". Since the instantaneous voltage drop compensation device and the uninterruptible power supply device are configured similarly, both of these devices may be collectively referred to as "power supply device" in the present specification.

Next, problems of the above-described basic operation will be described. An instantaneous voltage drop occurs only approximately several tens of times in one year, and bidirectional converters 81 to 85 maintain power storage devices 73 in a fully-charged state in most of the time when no instantaneous voltage drop occurs. When power storage devices 73 are in the fully-charged state, bidirectional converters 81 to 85 hardly pass a current. However, a switching loss occurs in bidirectional converters 81 to 85. This switching loss leads to a decrease in power feeding efficiency of the instantaneous voltage drop compensation device.

In order to deal with this, there is a method for reducing the switching loss in bidirectional converters 81 to 85 by determining the appropriate number of bidirectional converters required to drive the load based on the load capacity, and operating only the appropriate number of bidirectional converters, as disclosed in PTL 1.

Figure 11:
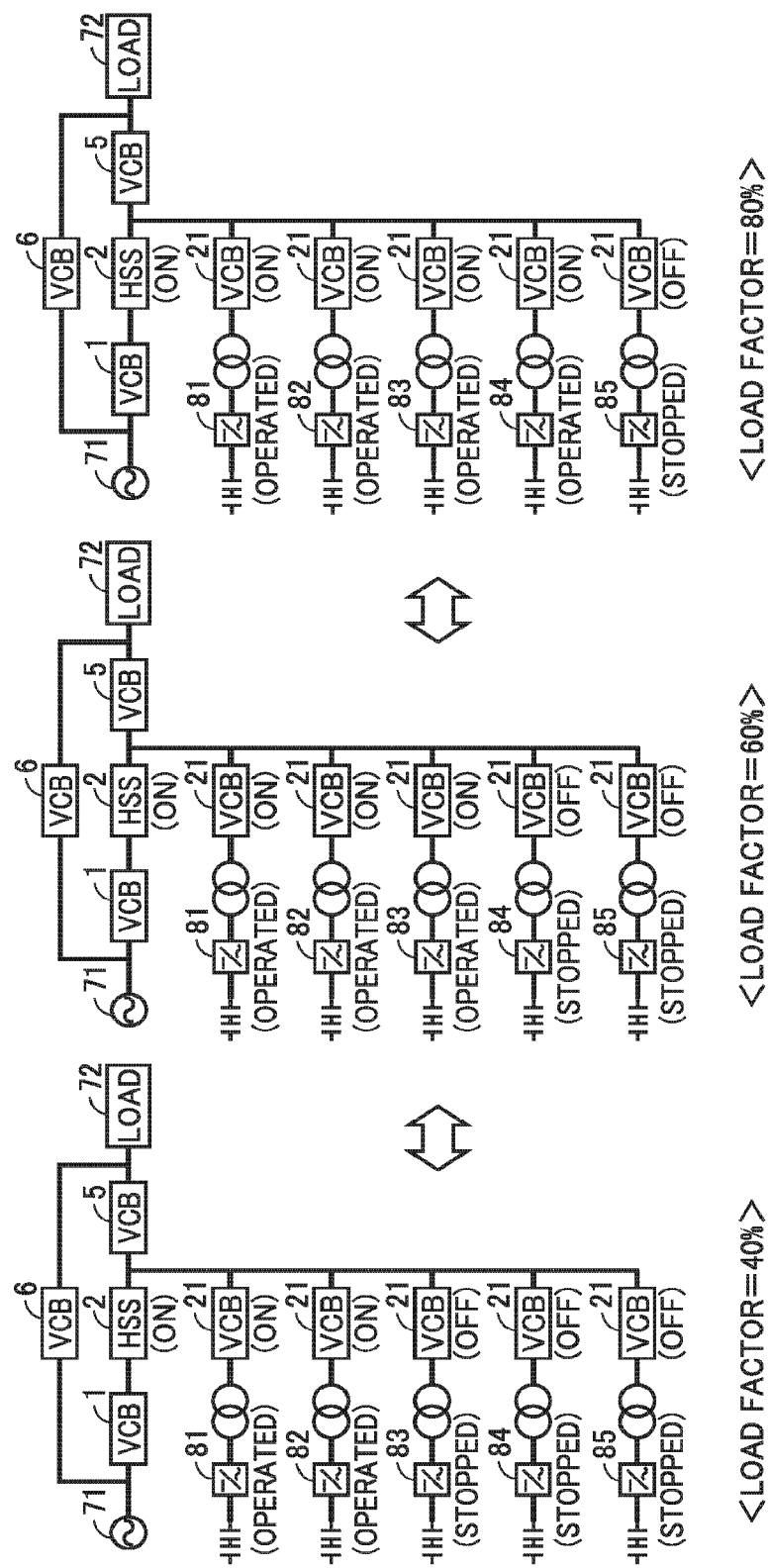
FIG. 11 is a diagram illustrating control of the number of bidirectional converters to be operated in the instantaneous voltage drop compensation device according to the comparative example.

FIG. 11 is a diagram for illustrating control of the number of bidirectional converters to be operated in an instantaneous voltage drop compensation device according to a comparative example. In the example shown in FIG. 11, the appropriate number when a load factor (ratio of an actual load capacity to a maximum load capacity) is 40% is two, the appropriate number when the load factor is 60% is three, and the appropriate number when the load factor is 80% is four.

When the load factor is 40%, two bidirectional converters 81 and 82 are operated and the operation of remaining three bidirectional converters 83 to 85 is stopped. Specifically, when AC voltage VI supplied from commercial AC power supply 71 is normal, the controller (not shown) turns on HSS 2, thereby supplying the AC power from commercial AC power supply 71 through HSS 2 to load 72. At the same time, the controller turns on VCBs 21 corresponding to bidirectional converters 81 and 82, thereby supplying the AC power from commercial AC power supply 71 through HSS 2, VCBs 21 and transformers 20 to bidirectional converters 81 and 82. The controller controls bidirectional converters 81 and 82 to convert the AC power into DC power and store the DC power in two power storage devices 73.

At this time, the controller turns off VCBs 21 corresponding to remaining three bidirectional converters 83 to 85 and stops the operation of bidirectional converters 83 to 85.

When an instantaneous voltage drop of AC voltage VI occurs in this state, the controller instantaneously turns off HSS 2 and controls the two bidirectional converters to convert the DC power of power storage devices 73 into AC power and supply the AC power to load 72 through transformers 20 and VCBs 21.

When the load capacity changes and the load factor increases from 40% to 60%, the controller starts up one bidirectional converter 83, of three bidirectional converters 83 to 85 that are in a stop state, and turns on VCB 21 corresponding to bidirectional converter 83. The controller controls three bidirectional converters 81 to 83.

When the load capacity further changes and the load factor increases from 60% to 80%, the controller further starts up one bidirectional converter 84, of two bidirectional converters 84 and 85 that are in a stop state, and turns on VCB 21 corresponding to bidirectional converter 84. The controller controls four bidirectional converters 81 to 84.

When the load factor decreases from 80% to 60%, the controller stops one bidirectional converter 84, of four bidirectional converters 81 to 84 that are operating, and turns off VCB 21 corresponding to bidirectional converter 84. When the load factor decreases from 60% to 40%, the controller stops one bidirectional converter 83, of three bidirectional converters 81 to 83 that are operating, and turns off VCB 21 corresponding to bidirectional converter 83.

As described above, in the instantaneous voltage drop compensation device according to the comparative example, only the appropriate number of bidirectional converters are connected to load 72 through VCBs 21 and operated based on the load capacity, and thus, the switching loss in the bidirectional converters can be reduced. However, according to this method, when the load capacity increases, the controller turns on VCB 21 and connects the bidirectional converter that is in a stop state to load 72, and starts up the bidirectional converter and starts to control the bidirectional converter. Therefore, slow responsiveness to a sudden change in load capacity is concerned. This is due to the use of the mechanical switch having a low operation speed as VCB 21 and the time required to start up the bidirectional converter and generate the control signal. As a result, during a time period from when the load capacity changes suddenly to when the bidirectional converter becomes ready for operation, the bidirectional converters that are operating may enter an overload state.

As described above, in the comparative example, it is concerned that it becomes difficult to compensate for an instantaneous voltage drop because of slow responsiveness to the sudden change in load capacity. In addition, since the appropriate number increases as the load factor becomes higher, the effect of reducing the switching loss is not sufficiently obtained in a state of the high load factor. The present disclosure has been made to solve these problems.

Control Configuration of Instantaneous Voltage Drop Compensation Device According to Present Embodiment Next, a control configuration of the instantaneous voltage drop compensation device according to the present embodiment will be described.

Figure 2:
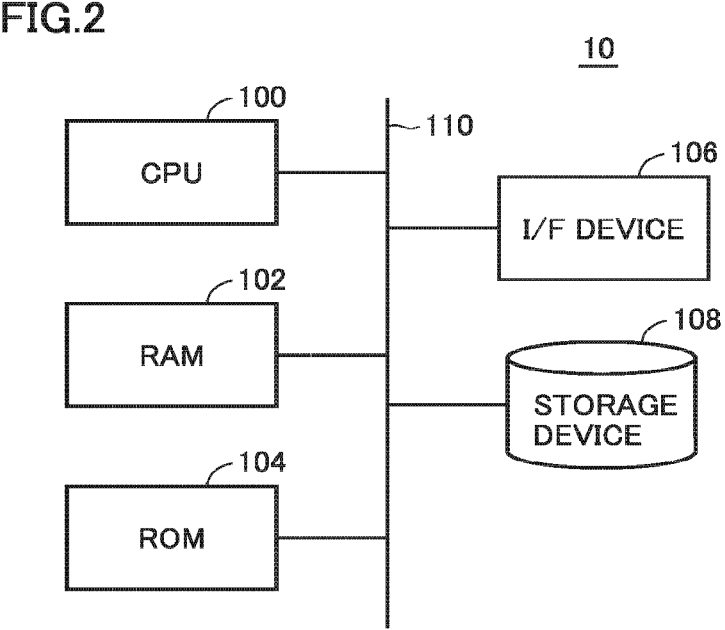
FIG. 2 shows a hardware configuration of a controller.

FIG. 2 shows a hardware configuration of controller 10.

As shown in FIG. 2, controller 10 includes a central processing unit (CPU) 100, a random access memory (RAM) 102, a read only memory (ROM) 104, an interface (I/F) device 106, and a storage device 108. CPU 100, RAM 102, ROM 104, I/F device 106, and storage device 108 exchange various types of data through a communication bus 110.

CPU 100 loads a program stored in ROM 104 into RAM 102 and executes the program. A process performed by controller 10 is described in the program stored in ROM 104.

I/F device 106 receives signals from various sensors and operation unit 9. In addition, I/F device 106 transmits on and off commands to VCBs 1, 5, 6, and 21 and HSS 2, and transmits the control signals to bidirectional converters 81 to 85.

Storage device 108 is a storage that stores various types of information, and stores information about load 72, information about power storage devices 73, information about operation conditions of bidirectional converters 81 to 85, and the like. Storage device 108 is implemented by, for example, a hard disk drive (HDD), a solid state drive (SDD) or the like.

At least a part of controller 10 may be implemented by a circuit such as a field programmable gate array (FPGA) and an application specific integrated circuit (ASIC).

Figure 3:
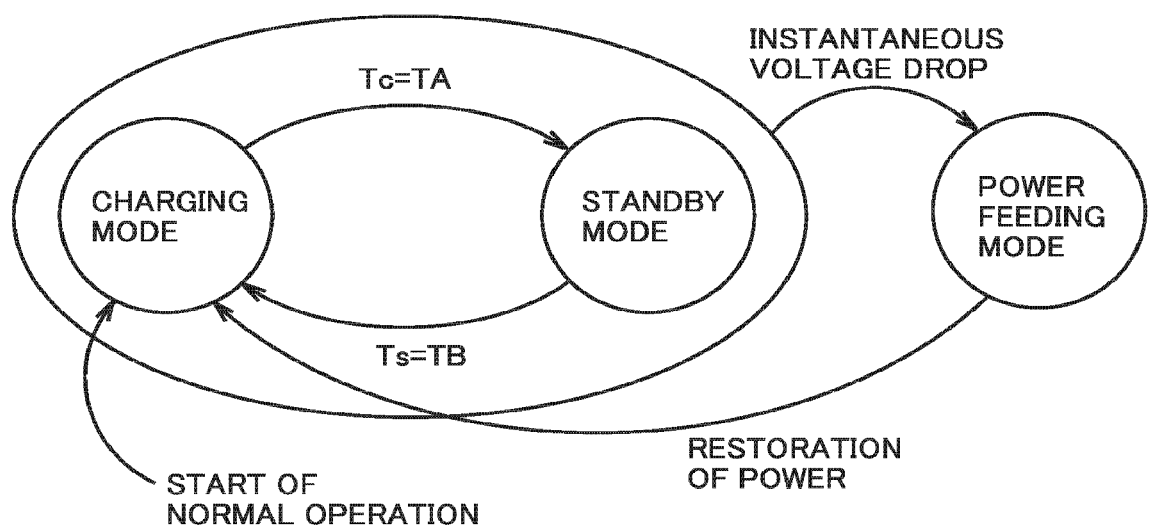
FIG. 3 is a transition diagram of an operation state of a bidirectional converter during normal operation of the instantaneous voltage drop compensation device according to the present embodiment.

FIG. 3 is a transition diagram of an operation state of the bidirectional converter during normal operation of the instantaneous voltage drop compensation device according to the present embodiment. As shown in FIG. 3, the instantaneous voltage drop compensation device has a charging mode, a standby mode and a power feeding mode as operation modes of the bidirectional converter.

The charging mode is a mode of storing electric power in power storage device 73. In the charging mode, the bidirectional converter converts the AC power supplied from commercial AC power supply 71 through VCB 1, HSS 2, VCB 21, and transformer 20 into DC power and stores the DC power in power storage device 73. The standby mode is a mode of generating the control signal (gate signal) for turning on and off the plurality of switching elements included in the bidirectional converter, and maintaining the plurality of switching elements in an off state. That is, the standby mode is a mode of generating the control signal for controlling the bidirectional converter, and awaiting the power conversion by the bidirectional converter. Since the control signal is generated during the standby mode, rapid transition of the bidirectional converter to the charging mode or the power feeding mode is possible.

The power feeding mode is a mode of supplying the electric power of power storage device 73 to load 72. In the power feeding mode, the bidirectional converter converts the DC power of power storage device 73 into AC power and supplies the AC power to load 72 through transformer 20 and VCBs 21 and 5.

When AC voltage VI supplied from commercial AC power supply 71 is normal, the bidirectional converter selectively performs the charging mode and the standby mode. Specifically, when the normal operation of the instantaneous voltage drop compensation device is started, the bidirectional converter is initially set to the charging mode. When power storage device 73 enters the fully-charged state in this state, transition from the charging mode to the standby mode occurs. When a predetermine time period TB elapses in this state, transition from the standby mode to the charging mode occurs.

Furthermore, when a predetermined charging time period TA elapses in the charging mode, transition from the charging mode to the standby mode occurs. Thereafter, when predetermined standby time period TB elapses in the standby mode, transition from the standby mode to the charging mode occurs. That is, when AC voltage VI supplied from commercial AC power supply 71 is normal, switching between the charging mode and the standby mode is alternately performed every time predetermined time periods TA and TB elapse.

When an instantaneous voltage drop of AC voltage VI occurs and it is determined that AC voltage VI supplied from commercial AC power supply 71 is not normal in this state, transition from the charging mode or the standby mode to the power feeding mode occurs. Thereafter, when AC voltage VI returns to the normal voltage (when the power of commercial AC power supply 71 is restored), transition from the power feeding mode to the charging mode occurs. When power storage device 73 enters the fully-charged state in this state, transition from the charging mode to the standby mode occurs. Thereafter, switching between the charging mode and the standby mode is alternately performed every time predetermined time periods TA and TB elapse.

Figure 4:
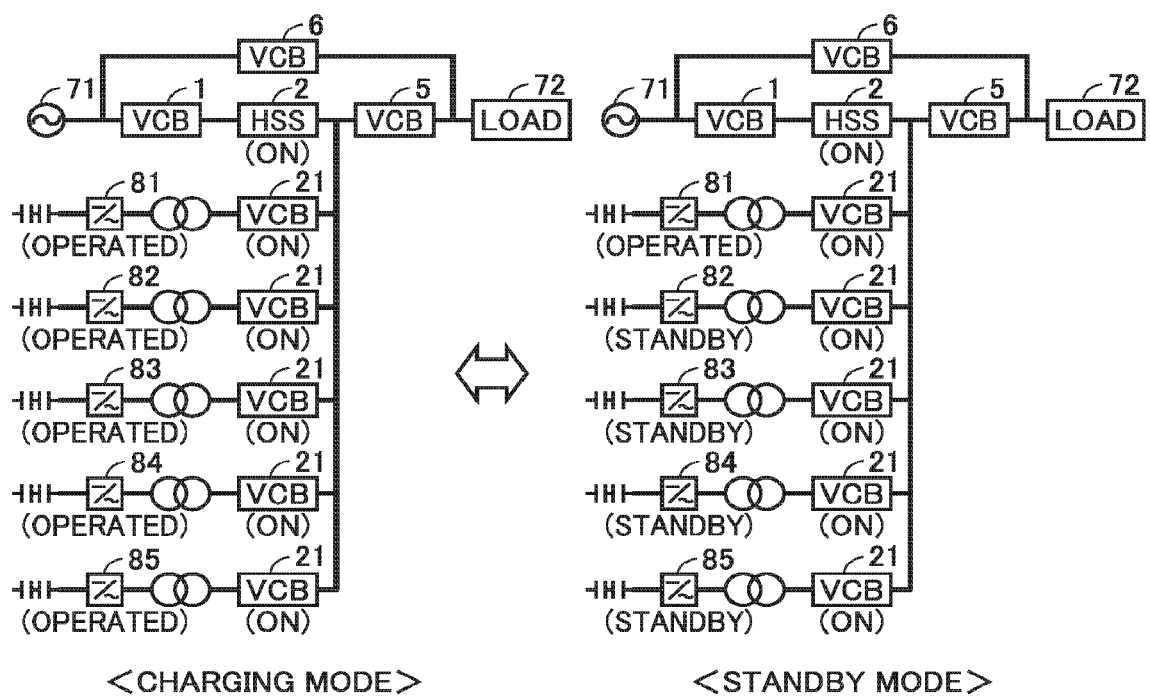
FIG. 4 is a diagram illustrating a charging mode and a standby mode shown in FIG. 3.

FIG. 4 is a diagram for illustrating the charging mode and the standby mode shown in FIG. 3. FIG. 4 shows an operation state of the instantaneous voltage drop compensation device in the charging mode and an operation state of the instantaneous voltage drop compensation device in the standby mode.

When AC voltage VI supplied from commercial AC power supply 71 is normal, HSS 2 is turned on, the AC power is supplied from commercial AC power supply 71 through VCB 1, HSS 2 and VCB 5 to load 72, and load 72 is operated. In this state, some of bidirectional converters 81 to 85 are subjected to alternate switching between the charging mode and the standby mode every time predetermined time periods TA and TB elapse. In the present embodiment, four bidirectional converters 82 to 85, of bidirectional converters 81 to 85, are operated intermittently. Bidirectional converters 82 to 85 correspond to one example of "first power converter".

In the charging mode, controller 10 causes bidirectional converters 82 to 85 to operate. The AC power is supplied to each bidirectional converter from commercial AC power supply 71 through VCB 1, HSS 2, VCB 21, and transformer 20. Each bidirectional converter converts the AC power into DC power and stores the DC power in corresponding power storage device 73.

In the standby mode, controller 10 brings bidirectional converters 82 to 85 to a state of awaiting the power conversion, while generating the control signals for bidirectional converters 82 to 85. Since the operation of bidirectional converters 82 to 85 is stopped, a switching loss in bidirectional converters 82 to 85 can be reduced to zero. However, since controller 10 generates the control signals for bidirectional converters 82 to 85 even in the stop state, rapid transition of bidirectional converters 82 to 85 from the standby mode to the charging mode or the power feeding mode is possible.

In the standby mode, some of bidirectional converters 81 to 85 are operated constantly. In the present embodiment, one bidirectional converter 81, of bidirectional converters 81 to 85, is operated constantly. This is because a resonance phenomenon may occur in a high frequency region and a harmonic current may flow out to a power distribution system due to a capacitance of the power distribution system to which the instantaneous voltage drop compensation device is connected and an inductance of the transformer and the like. When AC voltage VI is normal, bidirectional converter 81 is controlled to operate as a damping resistor that suppresses the outflow of the harmonic current to the power distribution system. Bidirectional converter 81 corresponds to one example of "second power converter".

The number of bidirectional converters to be operated constantly may only be smaller than the number of the plurality of bidirectional converters, and can be set as appropriate, depending on the size of the harmonic current and the like.

Figure 5:
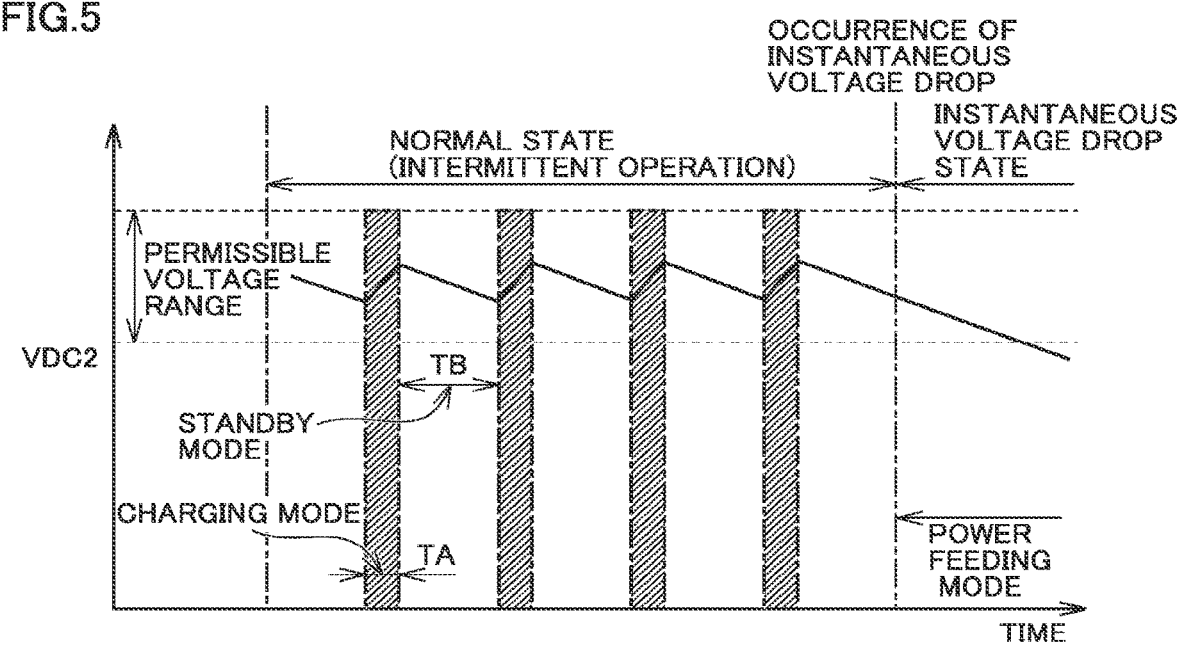
FIG. 5 is an operation waveform diagram during normal operation of the instantaneous voltage drop compensation device according to the present embodiment.

FIG. 5 is an operation waveform diagram during normal operation of the instantaneous voltage drop compensation device according to the present embodiment. FIG. 5 representatively shows a waveform of DC voltage VDC2 of DC terminal T32 connected to bidirectional converter 82.

DC voltage VDC2 corresponds to a voltage across the terminals of power storage device 73 and changes depending on a charging state of power storage device 73. DC voltage VDC2 increases as power storage device 73 approaches the fully-charged state. A permissible range is set for DC voltage VDC2 such that the voltage across the terminals of power storage device 73 when power storage device 73 is in the fully-charged state is an upper limit value. By keeping DC voltage VDC2 within this permissible range, power storage device 73 can be maintained in a state close to the fully-charged state.

When AC voltage VI supplied from commercial AC power supply 71 is normal, controller 10 causes bidirectional converter 82 to operate intermittently. In the charging mode, the AC power supplied from commercial AC power supply 71 is converted into DC power by bidirectional converter 82 and the DC power is stored in power storage device 73, and thus, DC voltage VDC2 rises.

In the standby mode, the operation of bidirectional converter 82 is stopped, and thus, power storage device 73 is not charged. Therefore, a switching loss in bidirectional converter 82 becomes zero. During this time, the electric power of power storage device 73 is consumed by, for example, a monitoring circuit that monitors the state of power storage device 73, which causes self-discharge, which is a phenomenon in which the remaining capacity of power storage device 73 decreases gradually. Due to this self-discharge of power storage device 73, DC voltage VDC2 also decreases gradually. The speed of decrease in DC voltage VDC2 changes depending on a type and an environment of power storage device 73.

As described above, switching between the charging mode and the standby mode is alternately performed every time charging time period TA and standby time period TB elapse, and thus, DC voltage VDC2 repeatedly rises and drops. By setting a time length of each of charging time period TA and standby time period TB such that DC voltage VDC2 fluctuates within the permissible range, it becomes possible to maintain power storage device 73 in a state close to the fully-charged state by the intermittent operation of bidirectional converter 82.

When an instantaneous voltage drop of AC voltage VI occurs during the intermittent operation of bidirectional converter 82, HSS 2 is instantaneously turned off, and at the same time, transition of bidirectional converter 82 from the charging mode or the standby mode to the power feeding mode occurs. As a result, the DC power of power storage device 73 is converted into AC power by bidirectional converter 82 and the AC power is supplied to load 72 through transformer 20 and VCBs 21 and 5. In the power feeding mode, DC voltage VDC2 decreases gradually with a decrease in remaining capacity of power storage device 73.

Although not shown, when the power of commercial AC power supply 71 is restored and AC voltage VI returns to the normal voltage, HSS 2 is turned on again and the AC power is supplied from commercial AC power supply 71 to load 72. At the same time, transition of bidirectional converter 82 from the power feeding mode to the charging mode occurs, and thus, the AC power supplied from commercial AC power supply 71 is again converted into DC power by bidirectional converter 82 and the DC power is stored in power storage device 73. The execution time of the charging mode immediately after restoration of the power of commercial AC power supply 71 is not limited by charging time period TA and the charging mode is continuously performed until power storage device 73 enters the fully-charged state. When power storage device 73 enters the fully-charged state, controller 10 again causes bidirectional converter 82 to operate intermittently.

Figure 6:
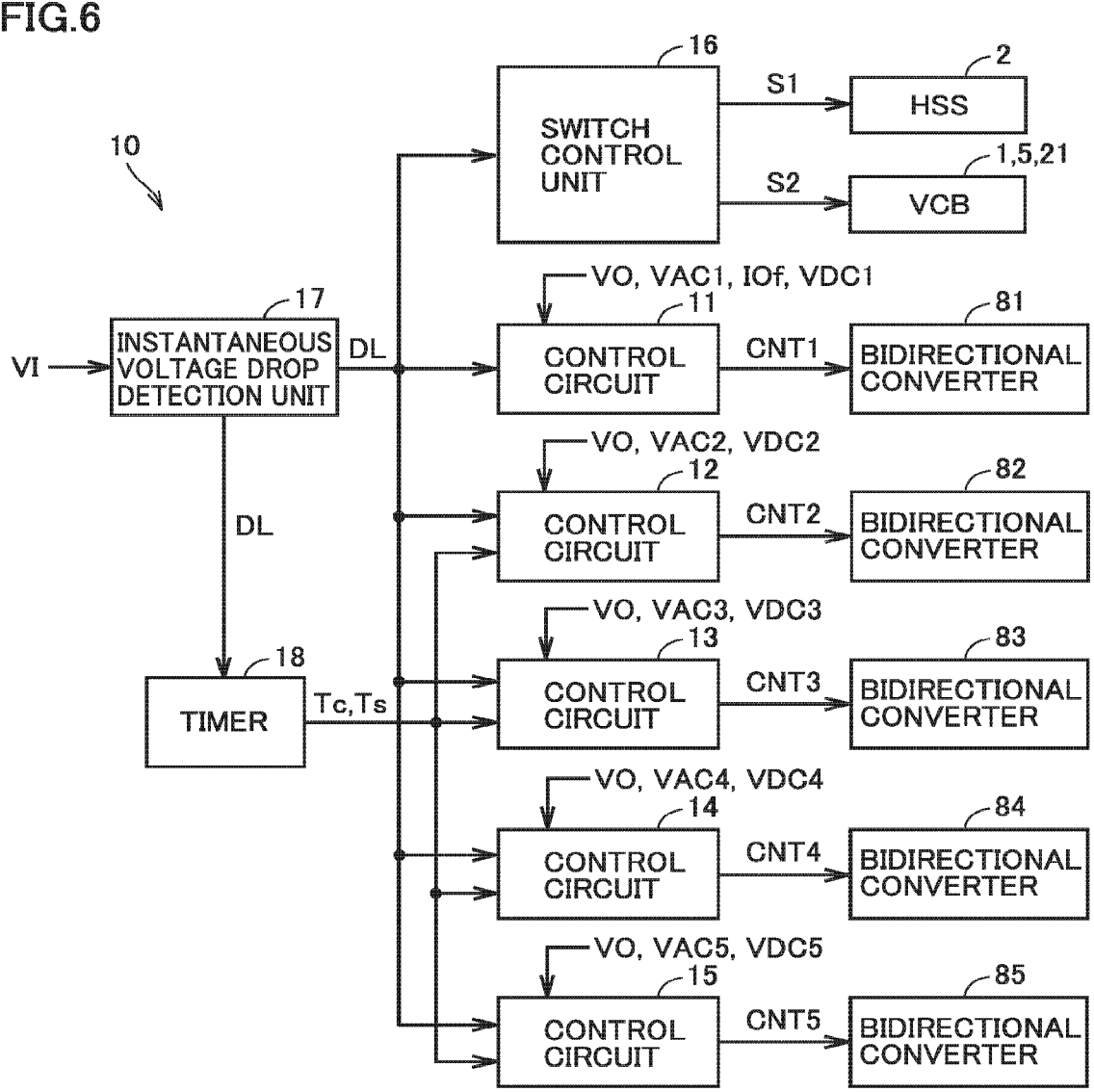
FIG. 6 is a block diagram showing a main part of the controller.

FIG. 6 is a block diagram showing a main part of controller 10. As shown in FIG. 6, controller 10 includes an instantaneous voltage drop detection unit 17, a timer 18, a switch control unit 16, and control circuits 11 to 15.

Instantaneous voltage drop detection unit 17 determines whether AC voltage VI supplied from commercial AC power supply 71 is normal, and provides an instantaneous voltage drop detection signal DL indicating a determination result to switch control unit 16, control circuits 11 to 15 and timer 18.

For example, when AC voltage VI is within the predetermined permissible range, instantaneous voltage drop detection unit 17 determines that AC voltage VI is normal. When AC voltage VI falls below the lower limit value of the permissible range, instantaneous voltage drop detection unit 17 determines that AC voltage VI is not normal. When AC voltage VI is normal, instantaneous voltage drop detection signal DL is set to an "L" level, which is a deactivation level. When AC voltage VI is not normal, instantaneous voltage drop detection signal DL is set to an "H" level, which is an activation level.

When instantaneous voltage drop detection signal DL is in the "L" level (i.e., when AC voltage VI is normal), timer 18 operates. Timer 18 measures an execution time Tc of the charging mode and an execution time Ts of the standby mode, and provides signals Tc and Ts indicating the measured times to control circuits 12 to 15.

Switch control unit 16 controls HSS 2 in accordance with instantaneous voltage drop detection signal DL. Specifically, when instantaneous voltage drop detection signal DL is in the "L" level (i.e., when AC voltage VI is normal), switch control unit 16 turns on HSS 2. When instantaneous voltage drop detection signal DL is in the "H" level (i.e., when AC voltage VI is not normal), switch control unit 16 turns off HSS 2.

In addition, during normal operation of the instantaneous voltage drop compensation device, switch control unit 16 turns on VCBs 1, 5 and 21. That is, switch control unit 16 turns on VCBs 1, 5 and 21 regardless of instantaneous voltage drop detection signal DL (i.e., regardless of whether AC voltage VI is normal).

Control circuits 11 to 15 are provided to correspond to bidirectional converters 81 to 85, respectively. Bidirectional converters 81 to 85 are controlled in accordance with control signals CNT1 to CNT5 provided from control circuits 11 to 15, respectively, and thus, bidirectional converters 81 to 85 can be controlled individually.

In the present embodiment, when AC voltage VI is normal, control circuit 11 causes bidirectional converter 81 to operate constantly and control circuits 12 to 15 cause bidirectional converters 82 to 85 to operate intermittently, respectively. When AC voltage VI is not normal (in the instantaneous voltage drop state), control circuits 11 to 15 cause bidirectional converters 81 to 85 to operate, respectively, and supply the AC power to load 72.

Specifically, control circuit 11 generates a control signal CNT1 for controlling bidirectional converter 81, in accordance with instantaneous voltage drop detection signal DL. When instantaneous voltage drop detection signal DL is in the "L" level (i.e., when AC voltage VI is normal), control circuit 11 generates control signal CNT1 based on signal IOf and AC voltages VO and VAC1, and causes bidirectional converter 81 to operate. By causing bidirectional converter 81 to operate, the outflow of the harmonic current generated due to the resonance phenomenon to the power distribution system is suppressed.

When instantaneous voltage drop detection signal DL is in the "H" level (i.e., when AC voltage VI is not normal), control circuit 11 causes bidirectional converter 81 to operate to discharge power storage device 73 and supply the AC power to load 72, based on DC voltage VDC1 and AC voltages VO and VAC1. At this time, control circuit 11 controls bidirectional converter 81 such that AC voltage VO becomes equal to reference AC voltage VOr.

Figure 7:
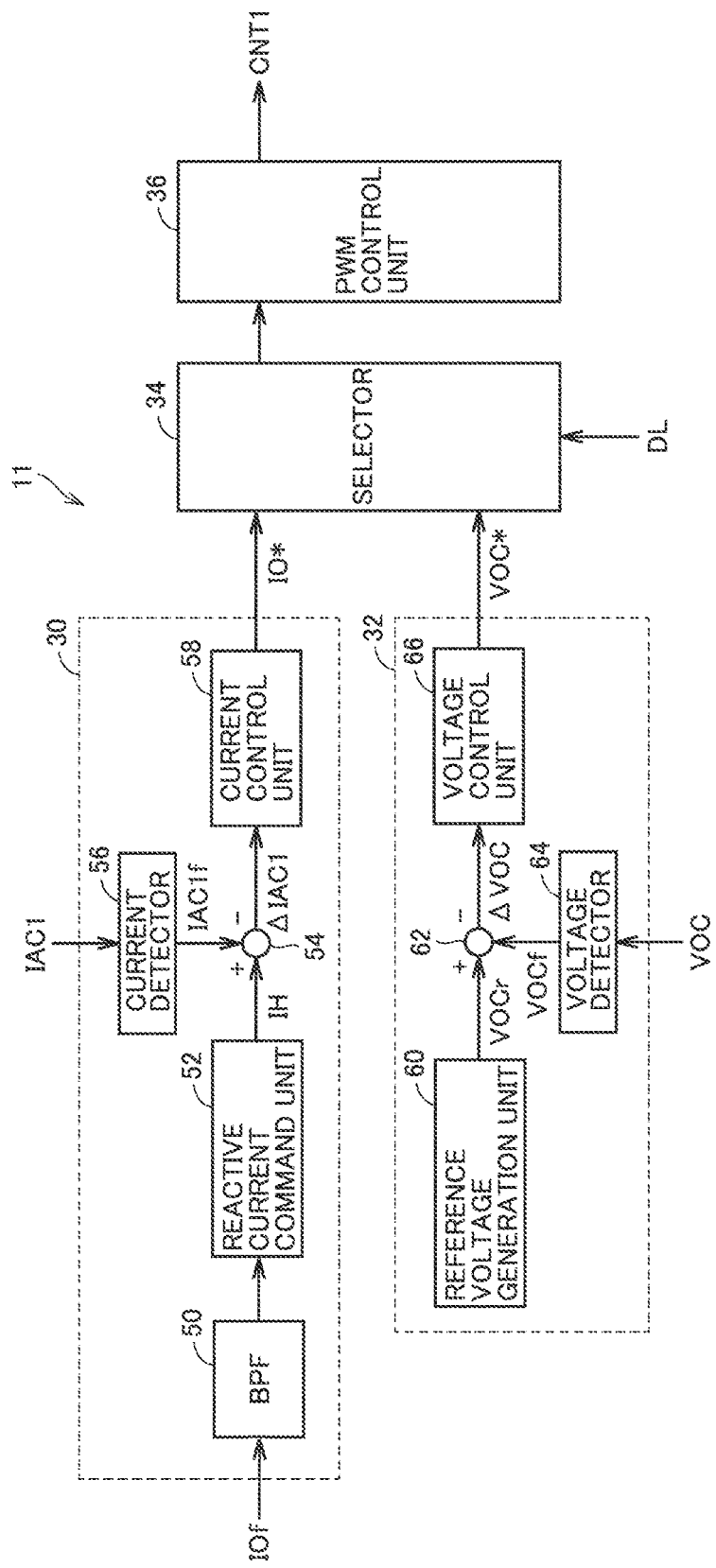
FIG. 7 is a block diagram showing a configuration of a control circuit 11 shown in FIG. 6.

FIG. 7 is a block diagram showing a configuration of control circuit 11 shown in FIG. 6. As shown in FIG. 7, control circuit 11 includes a resonance compensation unit 30, a discharging control unit 32, a selector 34, and a PWM control unit 36.

Resonance compensation unit 30 includes a band pass filter (BPF) 50, a reactive current command unit 52, a current detector 56, a subtractor 54, and a current control unit 58. BPF 50 extracts a harmonic current from AC current IO indicated by signal IOf output from current detector 7. Reactive current command unit 52 outputs a current command value IH having a polarity opposite to that of the harmonic current extracted by BPF 50.

Current detector 56 detects a compensation current IAC1 output from bidirectional converter 81, and outputs a signal IAC1f indicating the detected value. Subtractor 54 obtains a difference $\Delta IAC1 = IH - IAC1$ between current command value IH and compensation current IAC1 indicated by signal IAC1f output from current detector 56.

Current control unit 58 generates a current control value IAC1* such that difference $\Delta IAC1$ obtained by subtractor 54 becomes equal to zero. Current control unit 58 generates current control value IAC1* by, for example, adding a value proportional to difference $\Delta IAC1$ and a value proportional to an integral value of difference $\Delta IAC1$.

Discharging control unit 32 includes a reference voltage generation unit 60, a voltage detector 64, a subtractor 62, and a voltage control unit 66. Reference voltage generation unit 60 generates reference AC voltage VOr, which is a target voltage of AC voltage VO. Voltage detector 64 detects AC voltage VO output from output terminal T2, and outputs a signal VOf indicating the detected value.

Subtractor 62 obtains a difference $\Delta VOC = VOr - VO$ between reference AC voltage VOr and AC voltage VO indicated by signal VOf output from voltage detector 64. Voltage control unit 66 generates a voltage control value VOC* such that difference $\Delta VOC$ obtained by subtractor 62 becomes equal to zero. Voltage control unit 66 generates voltage control value VOC* by, for example, adding a value proportional to difference $\Delta VOC$ and a value proportional to an integral value of difference $\Delta VOC$.

Selector 34 selects any one of current control value IAC1* and voltage control value VOC*, based on signal (instantaneous voltage drop detection signal) DL output from instantaneous voltage drop detection unit 17. Specifically, when instantaneous voltage drop detection signal DL is in the "L" level (when AC voltage VI is normal), selector 34 selects current control value IAC1* and provides selected current control value IAC1* to PWM control unit 36. PWM control unit 36 compares current control value IAC1* provided from selector 34 with a carrier wave signal (e.g., triangular wave signal) having a predetermined frequency as to which is higher, and generates a gate signal of bidirectional converter 81 based on the comparison result. In accordance with this gate signal, the switching elements of bidirectional converter 81 are turned on and off, and a compensation current of the harmonic current is output from bidirectional converter 81. During operation of bidirectional converter 81, power storage device 73 takes in active power corresponding to loss compensation of bidirectional converter 81, and keeps the DC voltage.

When instantaneous voltage drop detection signal DL is in the "H" level (when AC voltage VI is not normal), selector 34 selects voltage control value VOC* and provides selected voltage control value VOC* to PWM control unit 36. PWM control unit 36 compares voltage control value VOC* provided from selector 34 with the carrier wave signal as to which is higher, and generates a gate signal of bidirectional converter 81 based on the comparison result. In accordance with this gate signal, the switching elements of bidirectional converter 81 are turned on and off, and the DC power of power storage device 73 is converted into AC power and the AC power is supplied to load 72.

Returning to FIG. 6, control circuit 12 generates a control signal CNT2 for controlling bidirectional converter 82, in accordance with instantaneous voltage drop detection signal DL and signals Tc and Ts output from timer 18. When instantaneous voltage drop detection signal DL is in the "L" level (when AC voltage VI is normal), control circuit 12 alternately switches bidirectional converter 82 between the charging mode and the standby mode, based on signals Tc and Ts output from timer 18.

Specifically, when Tc<TA, i.e., when execution time Tc of the charging mode is less than charging time period TA, control circuit 12 generates control signal CNT2 based on DC voltage VDC2 and AC voltage VAC2, and causes bidirectional converter 82 to operate to charge power storage device 73. At this time, control circuit 12 controls bidirectional converter 82 such that DC voltage VDC2 becomes equal to reference DC voltage VDCr.

When execution time Tc of the charging mode reaches charging time period TA, control circuit 12 causes transition of bidirectional converter 82 from the charging mode to the standby mode to occur. When Ts<TB, i.e., when execution time Ts of the standby mode is less than standby time period TB, control circuit 12 brings bidirectional converter 82 to a state of awaiting power conversion, while generating control signal CNT2. When execution time Ts of the standby mode reaches standby time period TB, control circuit 12 causes transition of bidirectional converter 82 from the standby mode to the charging mode to occur.

When instantaneous voltage drop detection signal DL is in the "H" level (when AC voltage VI is not normal), control circuit 12 causes transition of bidirectional converter 82 to the power feeding mode to occur. Control circuit 12 causes bidirectional converter 82 to operate to discharge power storage device 73 and supply the AC power to load 72, based on DC voltage VDC1 and AC voltages VO and VAC1. At this time, control circuit 12 controls bidirectional converter 82 such that AC voltage VO becomes equal to reference AC voltage VOr. The electric power supplied to load 72 is shared by all of bidirectional converters 81 to 85.

Figure 8:
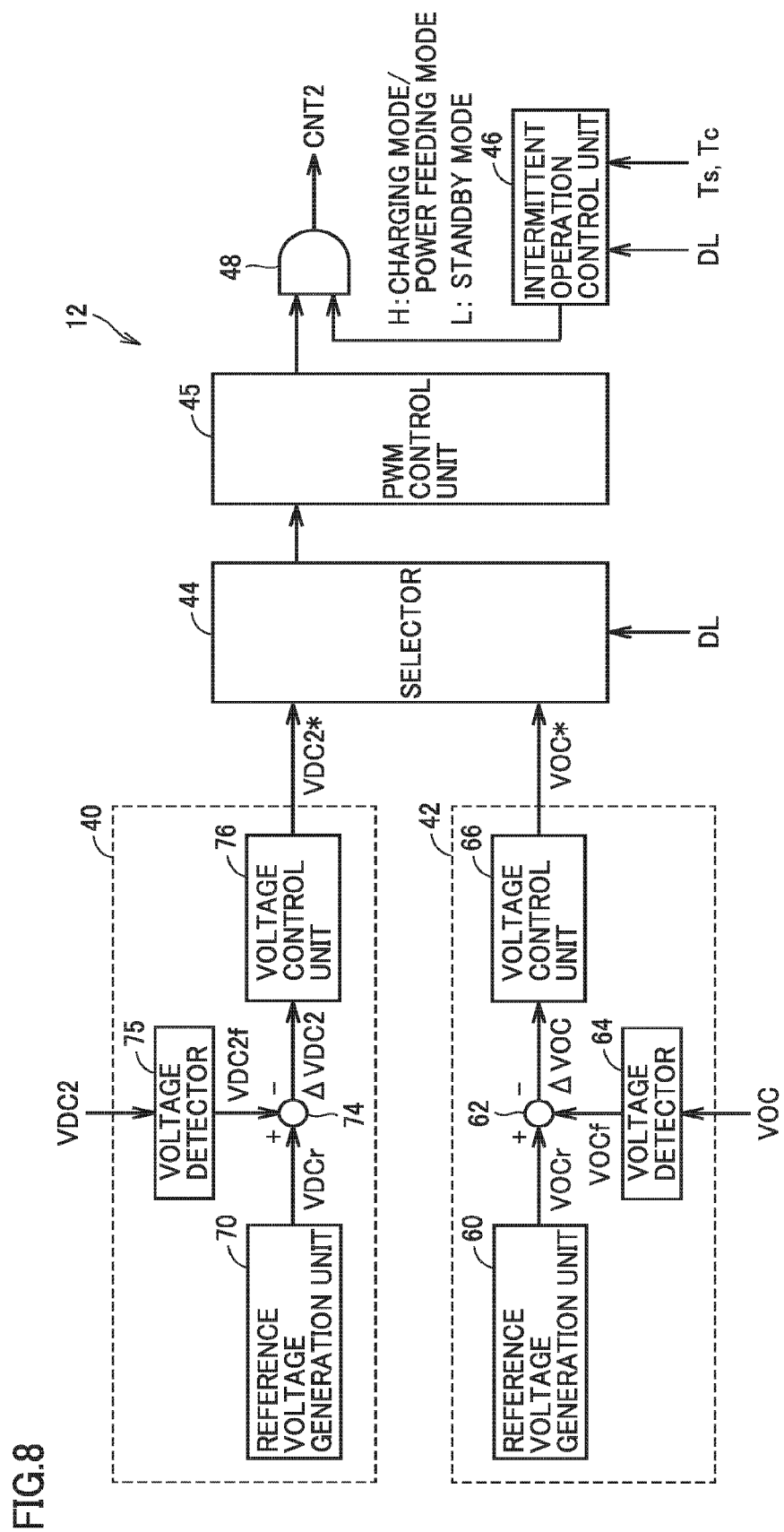
FIG. 8 is a block diagram showing a configuration of a control circuit 12 shown in FIG. 6.

FIG. 8 is a block diagram showing a configuration of control circuit 12 shown in FIG. 6. As shown in FIG. 8, control circuit 12 includes a charging control unit 40, a discharging control unit 42, a selector 44, a PWM control unit 45, an AND circuit 48, and an intermittent operation control unit 46.

Charging control unit 40 includes a reference voltage generation unit 70, a voltage detector 75, a subtractor 74, and a voltage control unit 76. Reference voltage generation unit 70 generates reference DC voltage VDCr, which is a target voltage of DC voltage VDC. Voltage detector 75 detects DC voltage VDC2 of DC terminal T32, and outputs a signal VDC2f indicating the detected value.

Subtractor 74 obtains a difference ΔVDC2 between reference DC voltage VDCr and DC voltage VDC2 indicated by signal VDC2f output from voltage detector 75. Voltage control unit 76 generates a voltage control value VDC2* such that difference ΔVDC2 obtained by subtractor 74 becomes equal to zero. Voltage control unit 76 generates voltage control value VDC2* by, for example, adding a value proportional to difference ΔVDC2 and a value proportional to an integral value of difference ΔVDC2. Voltage control value VDC2* corresponds to one example of "first control signal".

Discharging control unit 42 is configured similarly to discharging control unit 32 shown in FIG. 7, and includes reference voltage generation unit 60, subtractor 62, voltage detector 64, and voltage control unit 66. Discharging control unit 42 generates voltage control value VOC* such that difference ΔVOC between reference AC voltage VOr and AC voltage VO becomes equal to zero. Voltage control value VOC* corresponds to one example of "second control signal". Selector 44 selects any one of voltage control value VDC2* and voltage control value VOC*, based on signal (instantaneous voltage drop detection signal) DL output from instantaneous voltage drop detection unit 17. Specifically, when instantaneous voltage drop detection signal DL is in the "L" level (when AC voltage VI is normal), selector 44 selects voltage control value VDC2* and provides selected voltage control value VDC2* to PWM control unit 45. PWM control unit 45 compares voltage control value VDC2* provided from selector 44 with the carrier wave signal as to which is higher, and generates a gate signal (control signal) of bidirectional converter 82 based on the comparison result. The gate signal generated by PWM control unit 45 is input to a first input terminal of AND circuit 48.

When instantaneous voltage drop detection signal DL is in the "H" level (when AC voltage VI is not normal), selector 44 selects voltage control value VOC* and provides selected voltage control value VOC* to PWM control unit 45. PWM control unit 45 compares voltage control value VOC* provided from selector 44 with the carrier wave signal as to which is higher, and generates a gate signal of bidirectional converter 82 based on the comparison result. The gate signal generated by PWM control unit 45 is input to the first input terminal of AND circuit 48.

Intermittent operation control unit 46 controls intermittent operation of bidirectional converter 82, based on instantaneous voltage drop detection signal DL and signals Ts and Tc output from timer 18. Specifically, when instantaneous voltage drop detection signal DL is in the "H" level, i.e., when bidirectional converter 82 is in the power feeding mode, intermittent operation control unit 46 generates a control signal having the "H" level. When instantaneous voltage drop detection signal DL is in the "L" level and Tc<TA, i.e., when bidirectional converter 82 is in the charging mode, intermittent operation control unit 46 generates a control signal having the "H" level. On the other hand, when instantaneous voltage drop detection signal DL is in the "L" level and Ts<TB, i.e., when bidirectional converter 82 is in the standby mode, intermittent operation control unit 46 generates a control signal having the "L" level. The control signal generated by intermittent operation control unit 46 is input to a second input terminal of AND circuit 48.

AND circuit 48 carries out logical AND between the gate signal input to the first input terminal and the control signal input to the second input terminal, and outputs the calculation result as control signal CNT2. When the control signal is in the "H" level, i.e., when bidirectional converter 82 is in the power feeding mode or the charging mode, AND circuit 48 outputs the gate signal as it is. That is, the gate signal corresponds to control signal CNT2. On the other hand, when the control signal is in the "L" level, i.e., when bidirectional converter 82 is in the standby mode, AND circuit 48 outputs control signal CNT2 fixed to the "L" level, regardless of the gate signal.

According to this, when bidirectional converter 82 is in the power feeding mode or the charging mode, the switching elements of bidirectional converter 82 are turned on and off in accordance with control signal CNT2 (i.e., gate signal). As a result, when bidirectional converter 82 is in the power feeding mode, the DC power of power storage device 73 is converted into AC power and the AC power is supplied to load 72. When bidirectional converter 82 is in the charging mode, the AC power supplied from commercial AC power supply 71 is converted into DC power and the DC power is stored in power storage device 73.

In contrast, when bidirectional converter 82 is in the standby mode, the switching elements of bidirectional converter 82 are fixed to the off state in accordance with control signal CNT2 (gate signal) fixed to the "L" level, and thus, the operation of bidirectional converter 82 is stopped. Therefore, the switching loss in bidirectional converter 82 becomes zero.

When transition of the control signal output from AND circuit 48 from the "L" level to the "H" level occurs, control signal CNT2 is switched to the gate signal generated by PWM control unit 45, and thus, rapid transition of bidirectional converter 82 to the charging mode or the power feeding mode is possible.

Since control circuits 13 to 15 are configured similarly to control circuit 12, description thereof will not be repeated.

Figure 9:
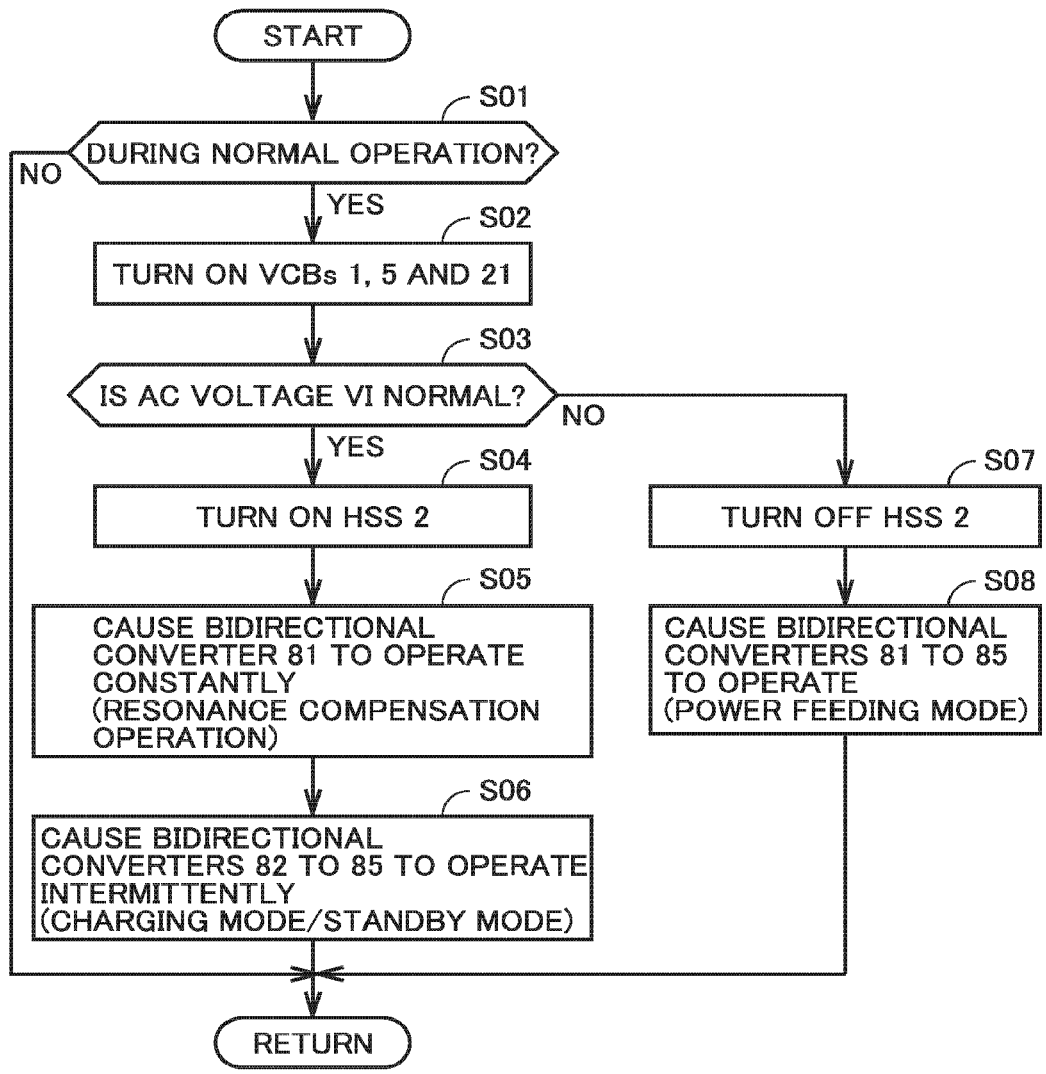
FIG. 9 is a flowchart showing a process procedure of the controller during normal operation of the instantaneous voltage drop compensation device.

FIG. 9 is a flowchart showing a process procedure of controller 10 during normal operation of the instantaneous voltage drop compensation device. A series of process shown in this flowchart is performed by controller 10 when a predetermined condition is satisfied or at predetermined cycles.

As shown in FIG. 9, in step (hereinafter, simply denoted as "S") 01, controller 10 determines whether the instantaneous voltage drop compensation device is performing normal operation. In S01, a YES determination is made when the startup command is received from operation unit 9 to start up the instantaneous voltage drop compensation device, and a NO determination is made when the stop command is received from operation unit 9 to stop the instantaneous voltage drop compensation device. When the instantaneous voltage drop compensation device is not performing normal operation (NO determination in S01), controller 10 skips the process in S02 and the subsequent steps.

When the instantaneous voltage drop compensation device is performing normal operation (YES determination in S01), controller 10 turns on VCBs 1, 5 and 21 and turns off VCB 6 in S02.

Then, in S03, controller 10 determines whether AC voltage VI supplied from commercial AC power supply 71 is normal. In S03, when AC voltage VI is within the permissible range, for example, controller 10 determines that AC voltage VI is normal, and a YES determination is made. When AC voltage VI falls below the lower limit value of the permissible range, controller 10 determines that AC voltage VI is not normal, and a NO determination is made.

When AC voltage VI is normal (YES determination in S03), the process proceeds to S04 and controller 10 turns on HSS 2. The AC power is supplied from commercial AC power supply 71 through VCB 1, HSS 2 and VCB 5 to load 72 and load 72 is operated.

Furthermore, in S05, controller 10 causes some of bidirectional converters (e.g., bidirectional converter 81) that are preset, of bidirectional converters 81 to 85, to operate constantly. In S05, controller 10 controls bidirectional converter 81 to output the compensation current having a polarity opposite to that of the harmonic current generated due to the resonance phenomenon in the power distribution system.

In S06, controller 10 causes the remaining bidirectional converters (e.g., bidirectional converters 82 to 85) to operate intermittently. In S06, controller 10 alternately switches each of bidirectional converters 82 to 85 between the charging mode and the standby mode at every predetermined time periods TA and TB, based on signals Ts and Tc output from timer 18.

In the charging mode, the AC power is supplied from commercial AC power supply 71 through VCB 1, HSS 2, VCBs 21, and transformers 20 to bidirectional converters 82 to 85 and the AC power is stored in power storage devices 73. Bidirectional converters 81 to 85 are operated and DC voltages VDC1 to VDC5 are maintained at reference DC voltage VDCr.

In the standby mode, the operation of bidirectional converters 82 to 85 is stopped and the switching loss in bidirectional converters 82 to 85 is reduced. During the standby mode, controller 10 generates the control signals for bidirectional converters 82 to 85.

Returning to S03, when AC voltage VI is not normal (NO determination in S03), the process proceeds to S07 and controller 10 turns off HSS 2. As a result, commercial AC power supply 71 and load 72 are electrically separated.

Furthermore, in S08, controller 10 causes bidirectional converters 81 to 85 to operate. In S08, controller 10 causes transition of bidirectional converters 81 to 85 to the power feeding mode to occur, and thus, the DC power of power storage devices 73 is converted into AC power by bidirectional converters 81 to 85, and the AC power is supplied to load 72 and the operation of load 72 is continued. Even when an instantaneous voltage drop of AC voltage VI occurs, controller 10 can cause rapid transition of bidirectional converters 82 to 85 to the power feeding mode to occur, using the control signals generated during the standby mode.

Figure 10:
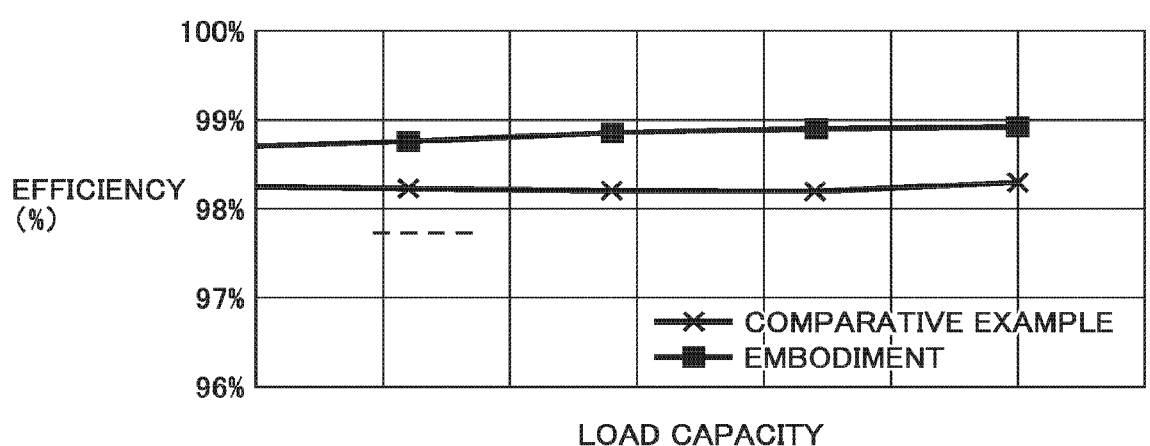
FIG. 10 shows one example of a change in power feeding efficiency with respect to a load capacity in the instantaneous voltage drop compensation device according to the present embodiment and an instantaneous voltage drop compensation device according to a comparative example.

As described above, in the instantaneous voltage drop compensation device according to the present embodiment, when the AC voltage supplied from the commercial AC power supply is normal, some of the plurality of bidirectional converters connected in parallel to the load are operated intermittently, and thus, it is possible to reduce the switching loss in the plurality of bidirectional converters, while maintaining the power storage devices in the fully-charged state, which results in enhancement of the power feeding efficiency. FIG. 10 shows one example of a change in power feeding efficiency with respect to the load capacity in the instantaneous voltage drop compensation device according to the present embodiment and the instantaneous voltage drop compensation device according to the comparative example (FIG. 11). As shown in FIG. 10, the power feeding efficiency can be improved in the present embodiment, as compared with the comparative example in which the number of bidirectional converters to be operated is controlled.

Furthermore, when the commercial AC power supply is normal, some of the bidirectional converters described above are alternately switched between the charging mode of storing the electric power in the power storage devices and the standby mode of generating the control signals for power conversion and awaiting power conversion by the bidirectional converters. Therefore, it is possible to enhance the responsiveness of the bidirectional converters to an instantaneous voltage drop of the commercial AC power supply and a sudden change in load capacity, while reducing the switching loss.

In addition, during normal operation of the instantaneous voltage drop compensation device, the plurality of VCBs that connect the plurality of bidirectional converters to the load, respectively, are on. Therefore, it is possible to improve the responsiveness to a sudden change in load capacity, as compared with the comparative example in which only the appropriate number of bidirectional converters are connected to the load through the VCBs based on the load capacity.

As a result, according to the present embodiment, it is possible to enhance the high-speed responsiveness of the instantaneous voltage drop compensation device, while achieving the high power feeding efficiency.

Furthermore, in parallel with the intermittent operation of some of the bidirectional converters described above, the other bidirectional converters are operated constantly to thereby compensate for the harmonic current of the power distribution system generated due to the resonance phenomenon. Therefore, it is possible to suppress the harmonic current that flows out to the power distribution system.

Although the configuration example of the instantaneous voltage drop compensation device including the plurality of DC terminals T31 to T35 has been described in the embodiment above, the number of DC terminals may be one. In this configuration, as shown in FIG. 12, the plurality of bidirectional converters 81 to 85 are connected in parallel to each other with respect to one DC terminal.

Figure 12:
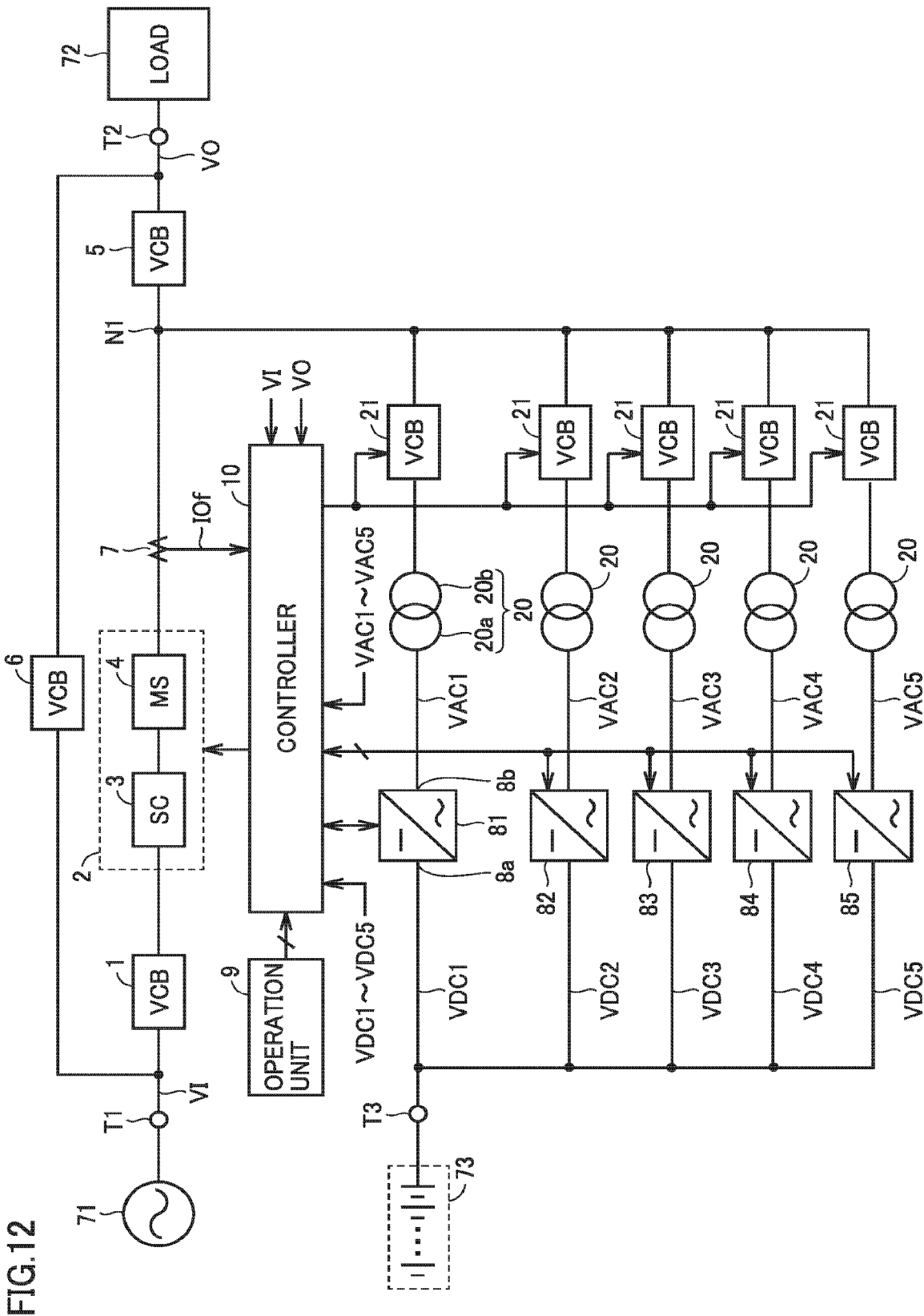
FIG. 12 is a block diagram showing another configuration example of the instantaneous voltage drop compensation device to which the power supply device according to the embodiment of the present disclosure is applied.

FIG. 12 is a block diagram showing another configuration example of the instantaneous voltage drop compensation device to which the power supply device according to the embodiment of the present disclosure is applied. The instantaneous voltage drop compensation device shown in FIG. 12 is different from the instantaneous voltage drop compensation device shown in FIG. 1 in that the instantaneous voltage drop compensation device shown in FIG. 12 includes a DC terminal T3 instead of the plurality of DC terminals T31 to T35. DC terminal T3 is connected to power storage device 73. DC terminal 8a of each of the plurality of bidirectional converters 81 to 83 is connected to DC terminal T3.

In the instantaneous voltage drop compensation device shown in FIG. 12 as well, when the AC voltage supplied from commercial AC power supply 71 is normal, some of the plurality of bidirectional converters 81 to 85 are operated intermittently, similarly to the instantaneous voltage drop compensation device shown in FIG. 1. In addition, during normal operation of the instantaneous voltage drop compensation device, the plurality of VCBs 21 that connect the plurality of bidirectional converters 81 to 85 to load 72, respectively, are on. Therefore, the same effect as that of the above-described embodiment is obtained.

It should be understood that the embodiment disclosed herein is illustrative and non-restrictive in every respect. The technical scope of the present disclosure is defined by the terms of the claims, rather than the description of the embodiment above, and is intended to include any modifications within the scope and meaning equivalent to the terms of the claims.

REFERENCE SIGNS LIST

2 HSS; 3 semiconductor switch; 4 mechanical switch; 7, 56 current detector; 9 operation unit; 10 controller; 11 to 15 control circuit; 16 switch control unit; 17 instantaneous voltage drop detection unit; 18 timer; 20 transformer; 30 resonance compensation unit; 32, 42 discharging control unit; 34, 44 selector; 36, 45 PWM control unit; 40 charging control unit; 46 intermittent operation control unit; 48 AND circuit; 52 reactive current command unit; 54, 63, 74 subtractor; 58 current control unit; 60, 70 reference voltage generation unit; 64, 75 voltage detector; 66, 76 voltage control unit; 71 commercial AC power supply; 72 load; 73 power storage device; 81 to 85 bidirectional converter; 100 CPU; 102 RAM; 104 ROM; 106 I/F device; 110 communication bus; T1 input terminal; T2 output terminal; T31 to T35 DC terminal; TA charging time period; TB standby time period.

The invention claimed is:

1. A power supply device comprising:
an input terminal connected to an AC power supply;
an output terminal connected to a load;
a DC terminal connected to a power storage device;
a switch connected between the input terminal and the output terminal;
a plurality of power converters, each of the plurality of power converters performing bidirectional power conversion between the DC terminal and the output terminal; and
a controller that controls the switch and the plurality of power converters, wherein
the plurality of power converters include at least one first power converter,
the at least one first power converter has a charging mode and a standby mode, the charging mode being a mode of converting AC power supplied from the AC power supply through the switch into DC power and storing the DC power in a corresponding power storage device, the standby mode being a mode of generating a control signal for the power conversion and awaiting the power conversion,
when an AC voltage supplied from the AC power supply is normal, the controller turns on the switch and alternately switches the at least one first power converter between the charging mode and the standby mode, and
when the AC voltage is not normal, the controller turns off the switch and controls the plurality of power converters such that each of the plurality of power converters converts DC power of the power storage device into AC power and supplies the AC power to the load.

2. The power supply device according to claim 1, wherein the plurality of power converters further include at least one second power converter, and
when the AC voltage is normal, the controller controls the at least one second power converter to supply a compensation current to the load, the compensation current having a polarity opposite to that of a harmonic current flowing out to the load.

3. The power supply device according to claim 1, wherein the controller includes a timer that measures an execution time of the charging mode and an execution time of the standby mode, and based on the times measured by the timer, the controller alternately switches the at least one first power converter between the charging mode and the standby mode at predetermined time intervals.

4. The power supply device according to claim 1, further comprising
a plurality of mechanical switches provided to correspond to the plurality of power converters, respectively, each of the plurality of mechanical switches being connected between a corresponding one of the plurality of power converters and the output terminal, wherein
during normal operation of the power supply device, the controller turns on the plurality of mechanical switches.

5. The power supply device according to claim 1, wherein
in the standby mode, the controller generates a first control signal and a second control signal, the first control signal being a signal for bringing a difference between a DC voltage of the DC terminal and a reference DC voltage to zero, the second control signal being a signal for bringing a difference between an AC voltage of the output terminal and a reference AC voltage to zero.

6. The power supply device according to claim 1, wherein the power supply device is an instantaneous voltage drop compensation device.

\* \* \* \* \*